United States Patent
Flood et al.

(10) Patent No.: US 6,233,092 B1
(45) Date of Patent: May 15, 2001

(54) MANAGEMENT AND UTILIZATION OF ASE IN OPTICAL AMPLIFIER

(75) Inventors: Felton Aaron Flood; Michael John Yadlowsky, both of Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/373,307

(22) Filed: Aug. 12, 1999

Related U.S. Application Data (60) Provisional application No. 60/104,536, filed on Oct. 16, 1998.

(51) Int. Cl.[7] ................. H01S 3/30; H04J 14/02
(52) U.S. Cl. ............ 359/345; 359/134; 359/160; 359/341; 372/6; 372/71
(58) Field of Search .................. 359/134, 160, 359/341, 345; 372/6, 70, 71

(56) References Cited

U.S. PATENT DOCUMENTS

| | | | |
|---|---|---|---|
| 5,185,749 | * | 2/1993 | Kalmen et al. ............ 372/6 |
| 5,191,586 | * | 3/1993 | Huber ..................... 372/6 |
| 5,440,417 | * | 8/1995 | Clung et al. ............ 359/134 |

OTHER PUBLICATIONS

Lee et al, OFC/IO OC'99, Opt. Fiber Communic. Conf., vol. 2, pp 7–9, Feb. 26, 1999.*

Shiagemakau et al, 25th European Conf. & Opt. Communic., vol. 1, pp 270–1, Sep. 30, 1999.*

Min et al, IEEE Photonics Tech. Lett., vol. 12, #5, pp 408–2, May 2000.*

Bixens et al, Electronics Letters, vol. 36, #9, pp 821–3, Apr. 27, 2000.*

Sun et al., Ultra Wide Band Erbium–Doped Silica Fiber Amplifier with 80 nm of Bandwith.

Srivastava et al., Signal Power Transients In Optically Amplified WDM Ring Networks.

* cited by examiner

*Primary Examiner*—Nelson Moskowitz
(74) *Attorney, Agent, or Firm*—Svetlana Z. Short; William Greener (57) ABSTRACT

An amplification stage of a multistage, rare earth doped optical amplifier, having a gain spectrum including a shorter wavelength band and a longer wavelength band, provided with excitation light produces an amount of ASE traveling in a reverse direction to the initial excitation light. The reverse traveling ASE light is directed to another amplification stage of the amplifier and substantially provides excitation light for pumping the longer wavelength band. The proposed amplifier structure and associated method of optical signal amplification efficiently utilizes unavoidable ASE light for optical signal amplification. The invention provides signal amplification in a wavelength band not heretofore efficiently utilized in conventional rare earth doped optical amplifiers.

44 Claims, 7 Drawing Sheets

MANAGEMENT AND UTILIZATION OF ASE IN OPTICAL AMPLIFIER

This application claims benefit to provisional application Ser. No. 60/104,536 filed Oct. 16, 1998.

FIELD OF THE INVENTION

The invention generally relates to optical amplifiers for high speed telecommunications systems, and more particularly, to an amplifier structure and associated method for efficient use of amplified spontaneous emission (hereinafter ASE) in a multistage, rare earth doped optical amplifier such as an EDFA, in which ASE is utilized for providing L-band optical signal amplification (hereinafter referred to as "ASE pumping").

DESCRIPTION OF RELATED ART

Optical telecommunications service providers continue to demand more data capacity and higher data transmission speeds to service their customers' current and future requirements. In systems employing EDFAs, however, channel density has been limited by the usable gain bandwidth of the EDFA. This bandwidth is on the order of 35 nm even when gain flattening filters are used to flattened the erbium gain spectrum for multichannel amplification. Three techniques for increasing system capacity in multichannel lightwave systems include (1) increasing bit rate per channel, (2) increasing the number of channels by decreasing channel spacing, and (3) increasing number of channels by increasing the total gain/transmission bandwidth of the gain media. Increasing the bit rate per channel is not always a viable solution as many installed systems cannot operate beyond the current OC-48 bit rate (2.5 Gb/s). Likewise, fiber non-linearities limit reducing channel spacing below the current values of 50 GHz–100 GHz. Thus increasing the EDFA gain bandwidth allows a direct path for increasing system capacity while maintaining channel spacing and bit rate per channel. As far back as 1990, Ainslie et al., High gain, broadband 1.6 micron $ER^{3+}$ doped silica fiber amplifier, *Electronics Letters*, volume 26, pp. 1645–1646 (1990) investigated the long band (1565–1610 nm) utility of the erbium gain spectrum. Recently, Srivastava et al., 1 Tb/s transmission of 100 WDM 10 Gb/s channels over 400 km of Truewave fiber, Tech. Dig. OFC'98, Post deadline paper PD10-1, San Jose, Calif., 1998, demonstrated application of silica EDFAs in the 1.6 micron band (L-band). Sun et al., Ultrawide band erbium-doped silica fiber amplifier with 80 nm of bandwidth, PROC. OAA, Post deadline paper PD 2-2, Victoria, BC Canada, 1997, discussed a split band architecture that amplifies both the conventional C-band (1530 nm–1560 nm) and the L-band, providing a total gain bandwidth of 80 nm. Thus L-band amplification offers a demonstrable, but undeveloped, solution to the bandwidth constraints in WDM lightwave systems.

It is appreciated by those skilled in the art that EDFAs operating in the L-band typically have features that distinguish them from amplifiers designed to work in the heavily used C-band from approximately 1530 nm to 1560 nm. Notable differences that have been observed include relatively flatter gain spectra at low inversions (i.e., 0.4 versus 0.6–0.7); and required longer lengths of erbium doped fiber. These are due at least in part to the relatively low emission cross section of erbium for wavelengths greater than approximately 1560 nm.

The power conversion efficiency for L-band EDFAs has typically been lower than that observed in conventional C-band EDFAs. We believe this is related to the approximately 10 times greater emission cross section of erbium in aluminum co-doped silica at the emission peak near 1530 nm than at 1600 nm; thus there can be considerable emission at the shorter wavelength before the signals in the longer band have been substantially amplified. This is compounded by the fact that the spontaneous emission near the emission peak will have a higher gain coefficient than the signals themselves (assuming that the inversion of the input stage is greater than approximately 60%, as required to get the noise performance typically desired of EDFAs for communications systems) and, as a result, is amplified at a higher rate. Moreover, the unusually long erbium doped fiber lengths required for low inversion amplification (i.e., $L \geq 100$ meters for current typical Er concentrations) provides large amounts of reverse traveling ASE.

Armed with an appreciation of the fact that signals contained within the erbium L-band can be efficiently pumped with pump wavelengths extending into the C-band, which is due to the properties of low inversion amplification, the inventors have recognized the utility of using properly managed ASE as an effective pump for L-band gain.

It is therefore an object of the invention to provide an optical amplifier, e.g., a multi-band amplifier, for an optical telecommunications system having increased bandwidth capabilities.

It is another object of the invention to provide an optical amplifier having a significantly expanded bandwidth in comparison to conventional optical amplifiers used in WDM transmission systems.

It is a further object of the invention to provide an optical amplifier having an expanded amplification bandwidth that is pumped by ASE generated by the long wavelength band structure of the amplifier.

It is still another object of the invention to provide an optical amplifier as described above that has desirable noise performance and which exhibits a design that is pump power efficient.

SUMMARY OF THE INVENTION

In accordance with these objectives and others, the invention is broadly directed to an optical amplifier having a structure that efficiently utilizes ASE (typically the wavelength region 1525 nm–1565 nm) as a pump source, and as a consequence provides an increased signal bandwidth over conventional C-band amplifiers. Additional features and advantages of the invention will be set forth in the description which follows, and in part will be apparent from the description, or may be learned by practice of the invention. The objective and other advantages of the invention will be realized and obtained by the apparatus and method particularly pointed out in the written description and claims hereof, as well as the appended drawings.

An embodiment of the invention is directed to an optical amplifier including first and second amplifier stages that are serially interconnected; and means for pumping either the first or the second amplifying stage in either a forward or a reverse direction for generating an amount of ASE from the pumped amplifier stage which is used for pumping the other, unpumped amplifier stage.

In another embodiment, an optical amplifier includes first and second amplifier stages that are serially interconnected by a coupler for propagating a signal light from the first amplifier stage to the second amplifier stage; and a pump light source coupled to the first amplifier stage via the coupler for introducing pump light in a reverse traveling direction into the first amplifier stage, wherein the reverse pumping of the first amplifier stage provides an amount of ASE traveling in a forward direction towards and into the second amplifier stage for providing L-band signal amplification in the second amplifier stage.

In another embodiment, an optical amplifier includes first and second amplification stages of erbium doped fiber which are serially interconnected by a coupler for propagating signal light from the first stage to the second stage and for coupling forward traveling pump light into the second amplification stage wherein an amount of ASE is generated in a reverse traveling direction from the second amplification stage to the fist amplification stage for causing L-band signal amplification in the first amplifier stage. In an aspect of this embodiment, the amplifier further includes means for receiving and redirecting an amount of unabsorbed ASE from the first amplifier stage back into the first amplifier stage.

In another embodiment, first and second serially connected rare earth doped amplification stages of lengths $L_1$ and $L_2$, respectively; a source of pumping light coupled to an input of the first stage for providing a relatively high inversion and substantially complete absorption of the pump light in that stage and which provides an amount of ASE traveling back towards the input of the first amplification stage; and means for receiving and redirecting the ASE to the input of the second amplification stage as a pump source for the second stage. In an aspect of this embodiment, the value α, defined as $$\frac{L_1}{(L_1 + L_2)}$$

is greater than 0.5. The pump light source for the first amplification stage is preferably in a wavelength band centered at about 980 nm. In an aspect of this embodiment, the ASE from the first amplification stage is redirected to the second stage by a feed forward optical path from stage 1 to stage 2.

In all of the preceding embodiments, the amplifying stages are preferably silica based erbium doped fiber waveguides; however, the principles of the invention are applicable to other rare earth doped optical amplifiers, e.g. thulium doped, working on the long wavelength side of three-level transitions.

In another embodiment, a method of amplifying an optical communication signal in a wavelength range between about 1565 nm to 1615 nm includes the steps of pumping a silica based erbium doped gain media, preferably an erbium doped fiber stage of an EDFA, with ASE that is generated by pumping another erbium doped fiber stage with non ASE pump light. In an aspect of this embodiment the non ASE pumped erbium doped fiber stage is preferably pumped with light having a wavelength band centered at about 980 nm or 1480 nm. In a preferred aspect of this embodiment, the method involves pumping a first stage erbium doped fiber with light having a wavelength centered at about 980 nm and pumping a second stage erbium doped fiber with ASE generated by pumping with the shorter wavelength (980 nm) pump light. In another aspect of this embodiment, the method includes redirecting the ASE from a first amplifier stage into a second amplifier stage for pumping the second amplifier stage with the ASE. This aspect of the invention preferably involves forward feeding the ASE around the first amplifier stage into the second amplifier stage.

It is to be understood that both the foregoing general description and the following detailed description are exemplary and are intended to provide further explanation of the invention as claimed.

The accompanying drawings are included to provide a further understanding of the invention and are incorporated in and constitute a part of this specification, illustrate embodiments of the invention and together with the description, serve to explain the principles of the invention.

DETAILED DESCRIPTION OF PREFERRED EMBODIMENT OF THE INVENTION

Preferred embodiments of the invention are directed to an erbium doped fiber amplifier that is pumped by ASE for amplifying optical signals in the L-band of the erbium gain spectrum (i.e., 1560–1620nm, see FIG. 7); and to a method for increasing the gain bandwidth of an erbium doped fiber amplifier by pumping the L-band of the erbium gain spectrum with ASE.

Reference will now be made in detail to the present preferred embodiments of the invention, examples of which are illustrated in the accompanying drawings presented herein.

Figure 1:
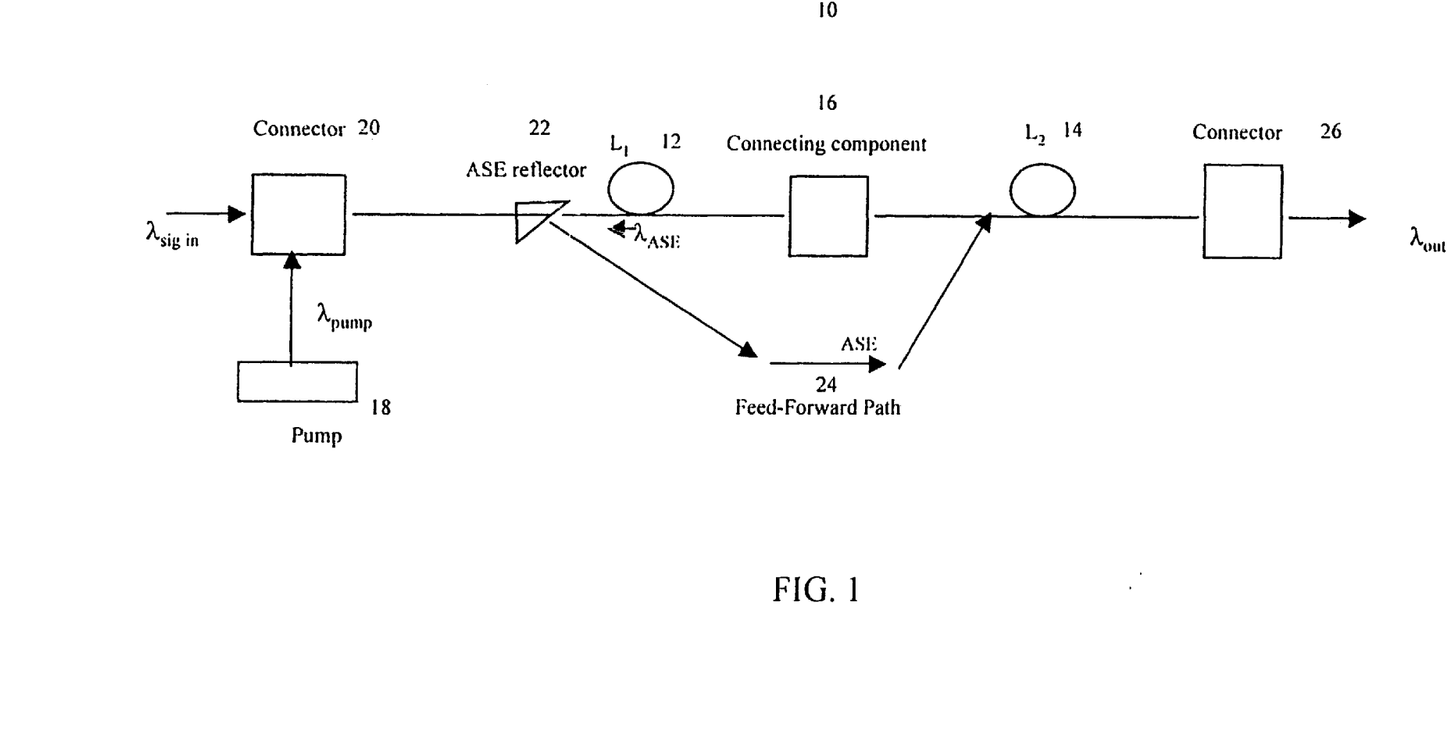
FIG. 1 schematically illustrates a 2 stage ASE pump amplifier with a feed forward ASE path from stage 1 to stage 2 according to an embodiment of the invention.

An optical amplifier 10 according to a preferred embodiment of the invention is illustrated in FIG. 1. The amplifier has a first erbium doped coil of fiber 12 having a length $L_1$ referred to herein as the first amplification stage, and a second erbium doped fiber coil 14 of length $L_2$, referred to as the second amplification stage. EDFs 12 and 14 are serially interconnected by connecting component 16 which optically couples the output of EDF 12 to the input of EDF 14 with respect to the propagation direction of the signal wavelength $\lambda_{sig}$ in as shown. A pump source 18 for pumping the first amplification stage 12 is coupled via connector 20 to the input of first amplification stage 12. The pump 18 preferably emits a pump wavelength pump in a wavelength band centered at about 980 nm, however 1480 nm pumping is suitable, as those skilled in the art will appreciate as the conventional pump wavelengths for EDFAs. The length $L_1$ of first amplifier stage 12 (i.e., the amplifier stage pumped by a conventional pump source) is preferably related to the length $L_2$ of second amplifier stage 14 by the expression $$\alpha = \frac{L_1}{(L_1 + L_2)}.$$

Alpha (a) is preferably in the range between 0.5 to 1.0, more preferably in the range from 0.85 to 0.95, and most preferably α is approximately equal to 0.9. Thus $L_1$ is approximately 4 to 5 times the value of $L_2$. The long length of the first amplification stage, preferably ≧100 meters, when pumped with light from pump source 18 such that essentially all of the pump light is absorbed in the first amplification stage, provides a low overall inversion (preferably about 0.4) and results in significant amounts of ASE propagating in a reverse direction (i.e., opposite to the direction of $\lambda_{pump}$). A component 22 is located near the input of first amplification stage 12 to reflect the reverse traveling ASE generated in $EDF_1$ over a feed forward path 24 around connecting component 16 and to the input of second amplification stage 14. Connecting component 16 typically includes an isolator which may not efficiently propagate $\lambda_{pump}$ equal to 980 nm. The ASE, centered at about 1530 nm, effectively pumps the L-band of the erbium gain spectrum of the second amplification stage 14 resulting in a wide signal band $\lambda_{sig_{out}}$ of about 80 nm (i.e., total C-band+L-band) when the amplifier is combined with a conventional C-band amplifier.

Figure 2:
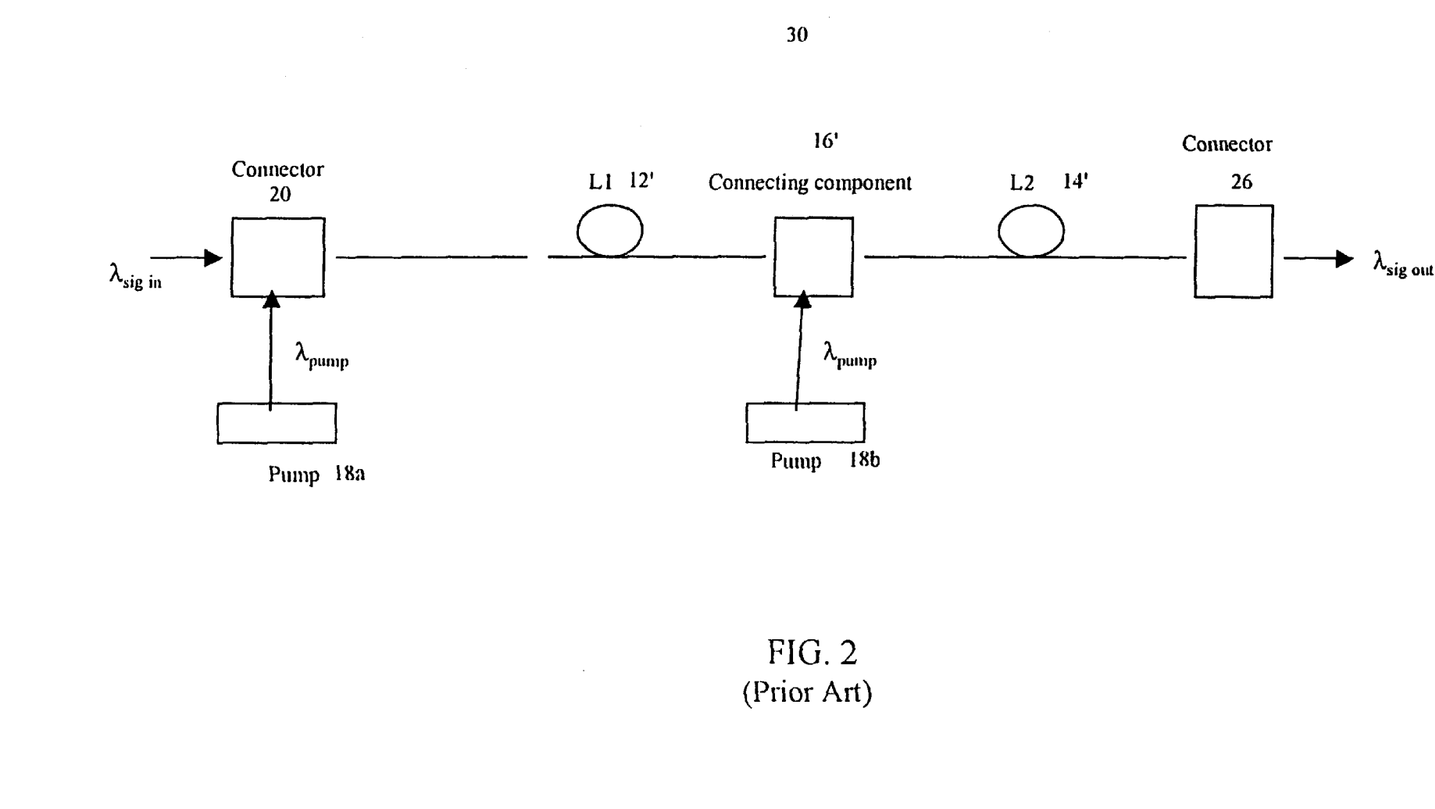
FIG. 2 schematically illustrates a conventional 2 stage amplifier with dual pump sources.
Figure 3:
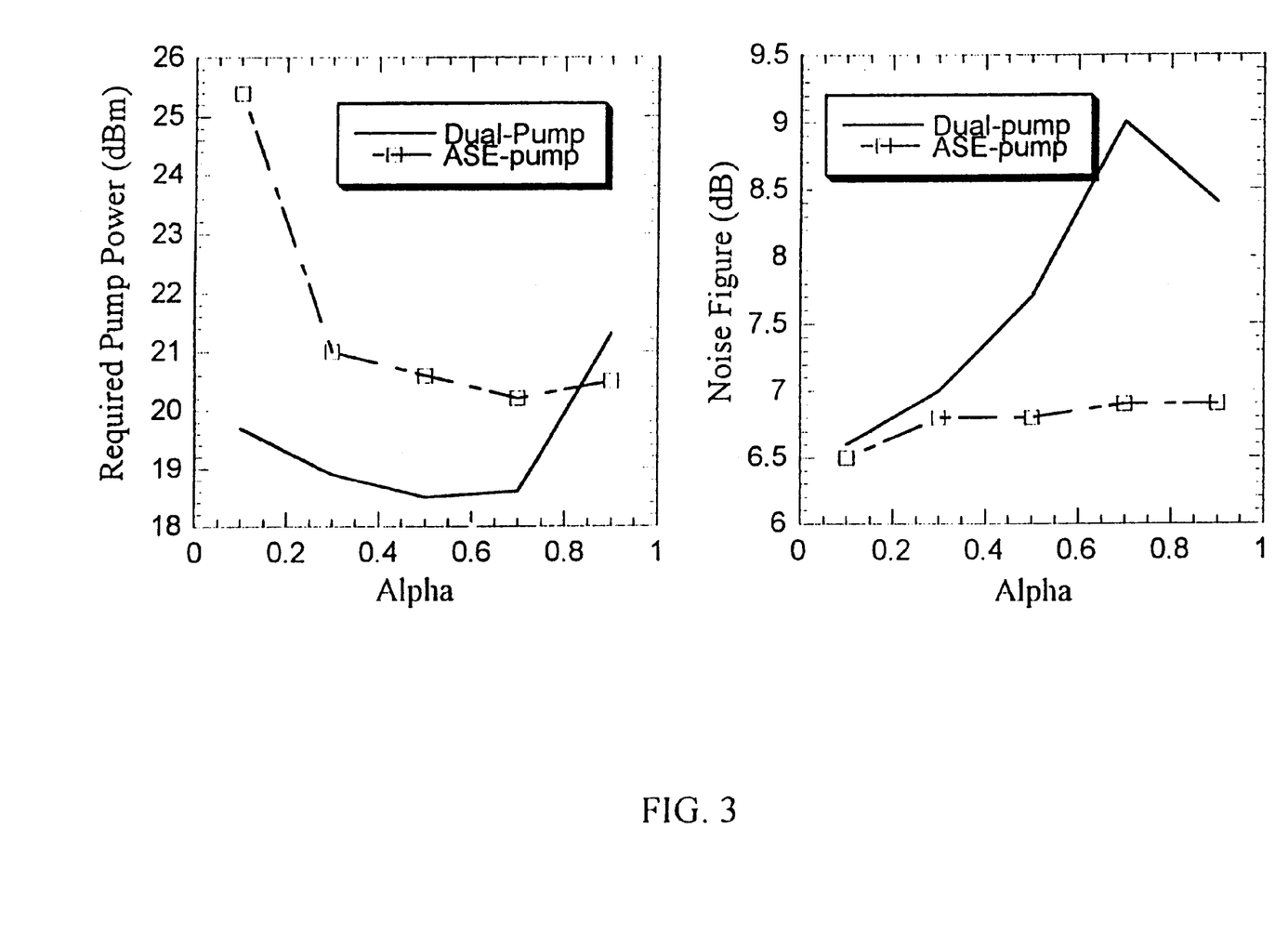
FIG. 3 illustrates a comparison of noise figure and required pump power versus alpha for the ASE pumped amplifier and dual stage amplifier of FIGS. 1 and 2 respectively.

In contrast to the ASE pumped amplifier according to the invention as shown in FIG. 1, a two stage/dual pump erbium doped fiber amplifier 30 is illustrated in FIG. 2. Like reference numerals have been used to indicate corresponding components of the amplifier where possible. As shown in FIG. 2, a first erbium doped fiber amplification stage 12' is serially connected to a second erbium doped fiber amplification stage 14' via connecting component 16'. A first pump source 18a sends pump light to the input of first amplification stage 12' via connector 20, and a second pump source 18b similarly sends pump light to the input of second amplification stage 14' via connecting component 16'. FIG. 3 shows plots of required pump power and noise figure as a function of $$\alpha \equiv \frac{L_1}{(L_1 + L_2)}$$

for the amplifier architectures shown in FIGS. 1 and 2. When α is less than 0.8, the ASE pump scheme requires more pump power (approximately 2 dB) while providing up to 2.0 dB lower noise figure compared to the dual pump architecture. When a>0.8, the required pump powers of both architectures are comparable, while the ASE pump scheme results in a 1.5 dB lower noise figure. This noise figure improvement is allegedly due to the inherent high front end inversion when all of the 980 nm pump signal is injected into and substantially absorbed by the first amplification stage.

Figure 4:
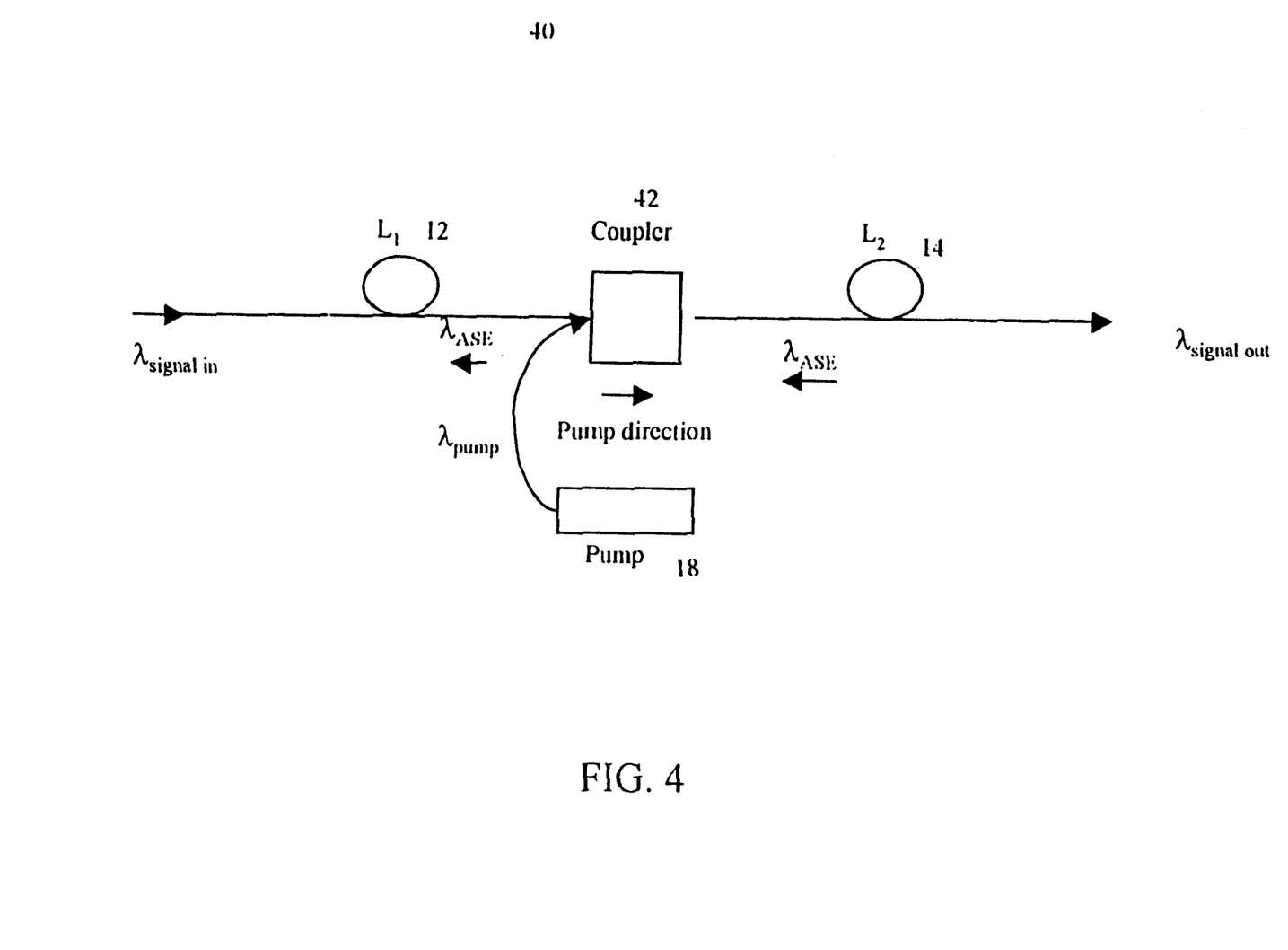
FIG. 4 schematically illustrates an ASE pumped L-band amplifier according to another embodiment of the invention.

Another embodiment of an ASE pumped optical amplifier 40 is illustrated in FIG. 4. A first erbium doped fiber amplification stage 12 having a length $L_1$ is serially coupled to a second erbium doped fiber amplification stage 14 having a length $L_2$ via coupler 42. A pump source 18, preferably emitting pump light in a wavelength band centered at about 980 nm, is forward coupled into the input of second amplification stage 14 via coupler 42. In this case the length of the second amplification stage 14 is related to the length $L_1$ of first amplification stage 12 in the same manner as $L_1$ was related to $L_2$ for the embodiment of FIG. 1; i.e., $L_2$ is preferably 4 to 5 times the value of $L_1$, and $L_1$ and $L_2$ are related as a defined in this case as $L_2/(L_1+L_2)$, where $0.5 \leq \alpha < 1.0$. The relatively longer length of second amplification stage 14 (preferably ≧100 meters) and the low inversion level n2 (preferably about 0.4) in second amplification stage 14 generates significant ASE in a reverse traveling direction with respect to the direction of $\lambda_{pump}$ towards first amplification stage 12, and is used to pump the fist amplification stage for signal amplification in the L-band.

Figure 5:
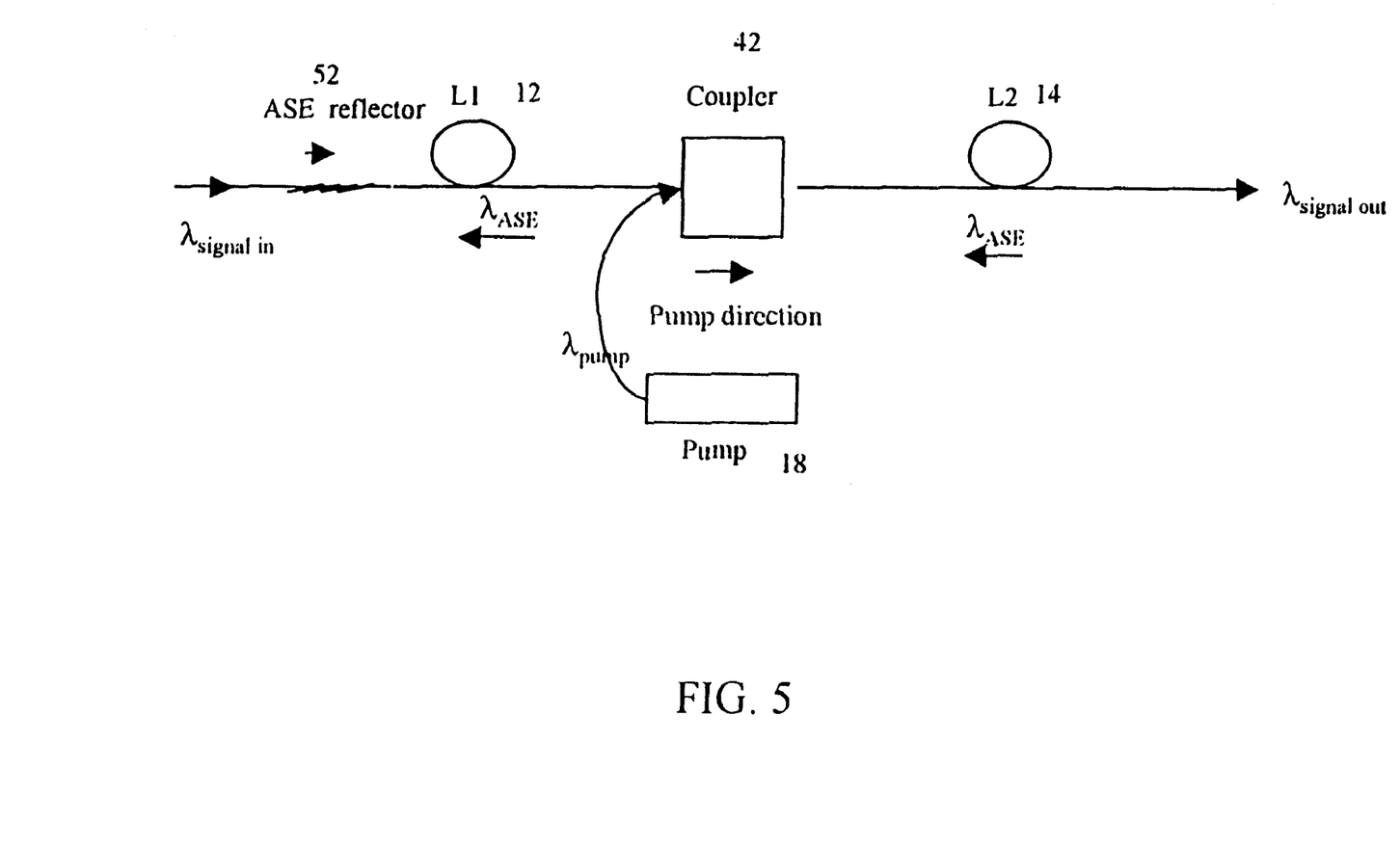
FIG. 5 illustrates an ASE pumped L-band amplifier according to another embodiment of the invention.

In another embodiment as shown in FIG. 5, an ASE reflector 52 is located near the upstream end of first amplification stage 12. In this manner, remnant ASE from first amplification stage 12 is reflected by ASE reflector 52 back into amplification stage 12 for efficient utilization of the ASE pump. Those skilled in the art will appreciate that the ASE reflector 52 of FIG. 5, and 22 of FIG. 1, can take the form of a grating, band splitter, thin film filter, WDM device, and other components suitable for reflecting or redirecting one or a band of wavelengths specifically in the ASE band (1525 nm–1565 nm) and so as not to affect the signals which are in a different band of wavelengths.

Figure 6:
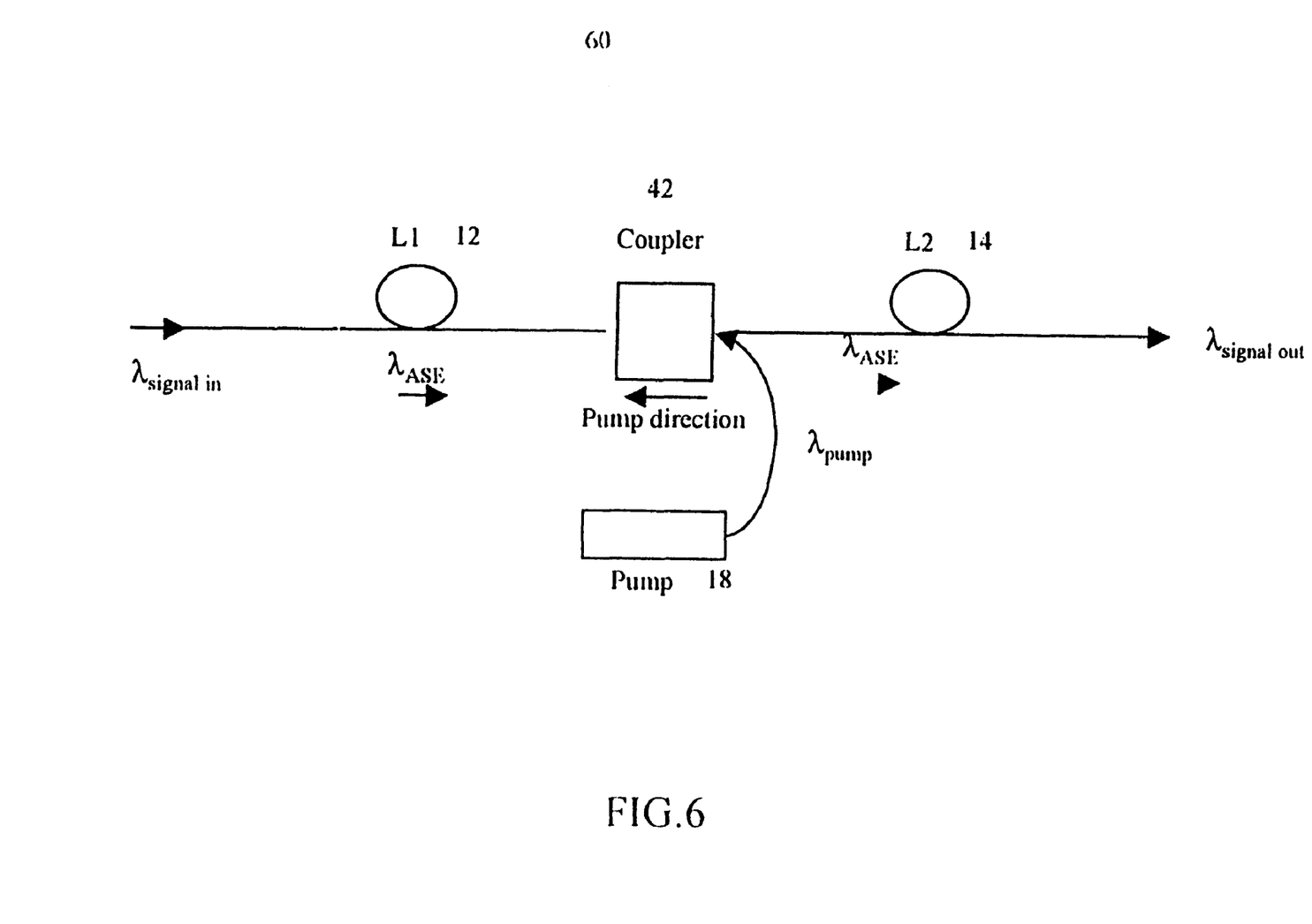
FIG. 6 illustrates an ASE pumped L-band amplifier according to another embodiment of the invention.

In another embodiment of the invention, as shown in FIG. 6, an ASE pumped optical amplifier 60 shows a first erbium doped fiber amplification stage 12 optically coupled to a second erbium doped fiber amplification stage 14 via coupler 42. A pump source 18 emitting pump light in a wavelength band preferably centered at about 980 nm is reverse coupled into amplification stage 12 via coupler 42 for reverse pumping amplification stage 12. As long as amplification stage 12 is long relative to amplification stage 14 (i.e., $0.5 \leq \alpha < 1.0$) and a low inversion is maintained in stage 12, as described above, reverse traveling ASE (i.e., opposite to the direction of pump light propagation from pump source 18) is generated and is coupled into amplification stage 14 for pumping the L-band of stage 14.

Figure 7:
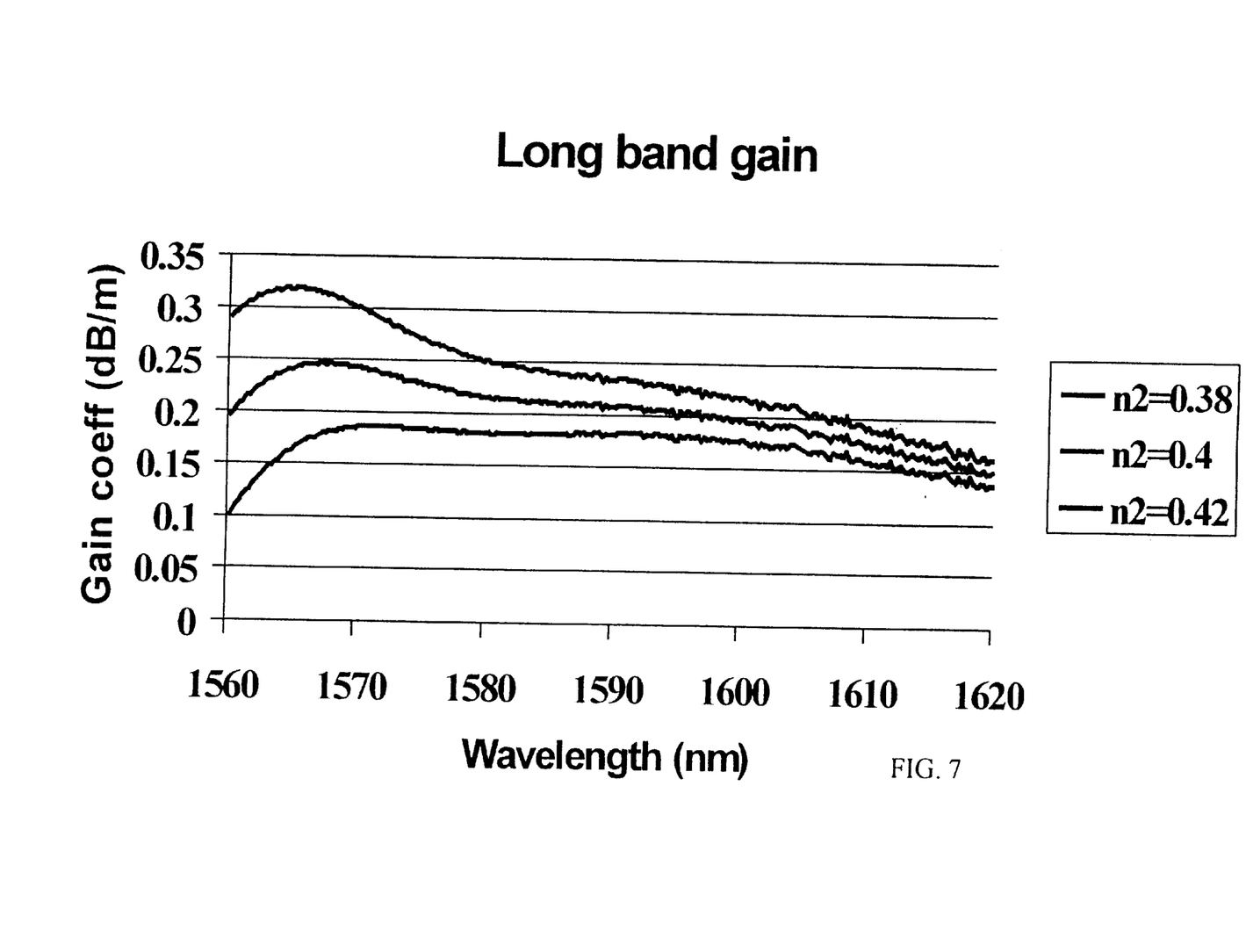
FIG. 7 shows exemplary gain vs. wavelength profiles in the erbium L-band for three different inversion levels.

In all of the embodiments described above, the method of generating L-band signal amplification in an erbium doped fiber amplifier includes pumping the erbium doped gain media with ASE in the $Er^{3+}$ C-band, centered at about 1530 nm. Preferably an amplifier with paired gain stages is provided wherein one stage has a length of approximately 4–5 times that of the other stage, the longer length being preferably ≧100) meters. The longer length erbium doped gain media is pumped by a conventional pump source in a wavelength band preferably centered around 980 nm in either a co- or counter-propagating direction. When the inversion is kept low in the longer length erbium doped gain media (preferably about 0.4), a significant amount of ASE is generated in a direction opposite to the original pumping direction. This "reverse" traveling ASE is then directed by various means described herein to an input of the other amplification stage and provides amplification of signal light in the L-band extending from about 1565–1620nm as shown in FIG. 7.

It will be appreciated by those skilled in the art that while the described implementation of the invention is achieved with silica based erbium doped waveguides in the form of coiled fiber, planar waveguide/amplifier implementations are also possible as long as the length of the erbium doped gain stage can be made sufficient to generate enough ASE to pump another erbium doped gain stage coupled to the first one. Moreover, the principles of the invention are applicable to other rare earth doped optical amplifiers using, e.g., thulium doped fiber or hybrids such as oxyhalide active fibers.

It will be apparent to those skilled in the art that various modifications and variations can be made in the apparatus and method of the present invention without departing from the spirit or scope of the invention. Thus it is intended that the present invention cover the modifications and variations of this invention provided they come within the scope of the appended claims and their equivalents.

We claim:

1. A multistage, wide band optical amplifier, comprising:
   a rare earth-doped gain medium having a gain spectrum in a spectral region comprising a shorter wavelength band and a longer wavelength band; and a source of pumping light coupled to a stage of the gain medium wherein an amount of ASE is emitted in a reverse direction to the direction of the pumping light;

means for introducing said ASE into another stage of the gain medium, further wherein said ASE substantially pumps the longer wavelength band.

2. The amplifier of claim 1, wherein the longer wavelength band includes a spectral region in which an emission cross section of the rare earth dopant is <10% of its peak value for a transition of interest.

3. The amplifier of claim 1, wherein the gain medium is in an optical fiber amplifier.

4. The amplifier of claim 1, wherein the gain medium is in a planar optical amplifier.

5. The amplifier of claim 4, wherein the fiber gain medium is a silica-based erbium doped optical fiber.

6. The amplifier of claim 1, wherein the gain medium comprises at least a first amplification stage and a second amplification stage which are serially interconnected.

7. The amplifier of claim 6, wherein one of the first and second amplification stages has a length, L1, and the other has a length, L2, respectively, further wherein a quantity $\alpha$ defined as L1/(L1+L2) is in the range $0.5 \leq \alpha < 1.0$.

8. The amplifier of claim 7, wherein a is in the range $0.85 \leq \alpha < 0.95$.

9. The amplifier of claim 7, wherein $\alpha$ is approximately equal to 0.9.

10. The amplifier of claim 6, wherein the non-ASE pump light is in a wavelength band centered at about 980 nm.

11. The amplifier of claim 6, wherein the non-ASE pump light is in a wavelength band centered at about 1480 nm.

12. The amplifier of claim 10, wherein the 980 nm pump light is in one of a forward traveling and a reverse traveling direction with respect to a direction of amplified signal light.

13. The amplifier of claim 11, wherein the 1480 nm pump light is in one of a forward traveling and a reverse traveling direction with respect to a direction of amplified signal light.

14. The amplifier of claim 1, further comprising means for redirecting unabsorbed ASE pump light into said another stage of the gain medium.

15. A wide band optical amplifier, comprising:

a first erbium doped fiber amplifier stage ($EDF_1$) having a length $L_1$;

a second erbium doped fiber amplifier stage ($EDF_2$) having a length $L_2$ including an input that is coupled to an output of $EDF_1$;

a pump light source coupled to an input of $EDF_1$ to provide a population inversion in $EDF_1$ wherein there is a relatively high absorption of the pump light in $EDF_1$, said pumping of EDF, providing an amount of amplified spontaneous emission (ASE) traveling in a reverse direction with respect to said pump light, towards the input of $EDF_1$;

means for receiving and redirecting said ASE to the input of $EDF_2$ for pumping $EDF_2$ with said ASE;

further wherein a value $\alpha \equiv L_1/(L_1+L_2)$, is greater than 0.5.

16. The amplifier of claim 15 wherein the pump light source provides light in a wavelength band centered at about 980 nm.

17. The amplifier of claim 15 wherein the pump light source provides light in a wavelength band centered at about 1480 nm.

18. The amplifier of claim 16, wherein the means for receiving and redirecting said ASE to the input of $EDF_2$ includes a feed forward path from $EDF_1$ to $EDF_2$.

19. The amplifier of claim 15 wherein $L_1 \geq 100$ meters.

20. The amplifier of claim 15 wherein $EDF_1$ and $EDF_2$ are silica-based EDF's.

21. The amplifier of claim 15 wherein $0.5 \leq \alpha < 1.0$.

22. The amplifier of claim 15 wherein $0.85 \leq \alpha < 0.95$.

23. The amplifier of claim 15 wherein $\alpha \equiv 0.9$.

24. A wide band optical amplifier, comprising:

a first erbium doped fiber amplifier stage ($EDF_1$) having an input and an output;

a second erbium doped fiber amplifier stage ($EDF_2$) having an input and an output wherein the output of $EDF_1$ is coupled to the input of $EDF_2$;

a coupler disposed intermediate $EDF_1$ and $EDF_2$ for propagating a signal light from $EDF_1$ to $EDF_2$;

a pump light source coupled to the input of $EDF_2$ for introducing pump light in a forward traveling direction into $EDF_2$, said forward pumping of $EDF_2$ providing an amount of amplified spontaneous emission (ASE) traveling in a reverse direction with respect to said pump light, towards and into $EDF_1$ wherein said ASE substantially provides excitation light for L-band signal amplification by $EDF_1$.

25. The amplifier of claim 24, further comprising means for receiving and redirecting an amount of unabsorbed ASE from $EDF_1$ back into $EDF_1$.

26. The amplifier of claim 24, wherein $EDF_1$ has a length, L2, and $EDF_2$ has a length, L1, further wherein a value $\alpha \equiv L1/(L1+L2)$, is greater than 0.5.

27. A wide band optical amplifier, comprising:

a first rare earth doped amplifier stage ($S_1$) having an input and an output;

a second rare earth doped amplifier stage ($S_2$) having an input and an output wherein the output of $S_1$ is coupled to the input of $S_2$;

means for pumping one of $S_1$ and $S_2$ in one of a forward and a reverse direction for generating an amount of ASE from said pumped stage, said ASE traveling in one of a reverse and forward direction, respectively, for pumping one of $S_2$ and $S_1$, respectively.

28. The amplifier of claim 27 further comprising means for receiving and redirecting an amount of unabsorbed ASE in said ASE pumped stage back into said ASE pumped stage.

29. The amplifier of claim 27 wherein $S_1$ and $S_2$ comprise erbium doped, silica based waveguides.

30. The amplifier of claim 29 wherein $S_1$ and $S_2$ are fiber waveguides.

31. The amplifier of claim 29 wherein $S_1$ and $S_2$ are planar waveguides.

32. The amplifier of claim 27 wherein the pumping means include pump light in a band centered at about 980 nm.

33. The amplifier of claim 27 wherein the pumping means include pump light in a band centered at about 1480 nm.

34. The amplifier of claim 27 wherein at least one of $S_1$ and $S_2$ has a gain spectrum including a spectral region in which an emission cross section of the rare earth dopant is $\leq 10\%$ of its peak value for a transition of interest.

35. A wide band optical amplifier, comprising:

a first rare earth doped amplifier stage ($S_1$) having an input and an output;

a second rare earth doped amplifier stage ($S_2$) having an input and an output wherein the output of $S_1$ is coupled to the input of $S_2$;

a coupler disposed intermediate $S_1$ and $S_2$ for propagating a signal light from $S_1$ to $S_2$;

a pump light source coupled to the output of $S_1$ for introducing pump light in a reverse traveling direction into $S_1$, said reverse pumping of $S_1$ providing an amount of amplified spontaneous emission (ASE) traveling in a forward direction with respect to said pump light, towards and into $S_2$ for causing L-band signal amplification in $S_2$.

36. The amplifier of claim 35 wherein the pump light source is in a spectral band centered at about 980 nm.

37. The amplifier of claim 35 wherein the pump light source is in a spectral band centered at about 1480 nm.

38. A method of amplifying an optical communication signal, comprising the steps of:

pumping a rare earth doped optical waveguide amplifier stage with light in a wavelength band from about 1460 nm to about 1550 nm by means other than a laser diode or LED centered at about 1480 nm for amplifying said signal in a wavelength range between about 1565 nm–1615 nm.

39. The method of claim 38 comprising pumping the amplifier stage with ASE light from another amplifier stage that is pumped with non-ASE light.

40. The method of claim 39 wherein the ASE is provided by pumping the other amplifier stage with light in a wavelength band centered at about 980 nm.

41. The method of claim 38 comprising pumping a spectral region in the signal wavelength range having an emission cross section of the rare earth dopant that is $\leq 10\%$ of its peak value for a signal transition of interest.

42. The method of claim 39 comprising providing the non-ASE pumped amplifier stage having an optical length, L1;

providing the ASE-pumped amplifier stage having an optical length, L2, wherein a value $\alpha = L_1/(L_1+L_2)$, is greater than 0.5.

43. A method of amplifying an optical communication signal in an EDFA in a wavelength range between about 1565 nm–1615 nm, comprising the steps of:

providing a first silica-based EDF having a length L1;

providing a second silica-based EDF having a length $L_2$, serially coupled to the first EDF, wherein a value $\alpha = L_1/(L_1+L_2)$ is in the range $0.5 \leq \alpha < 1.0$;

pumping the first EDF with light in a wavelength band centered at about 980 nm such that substantially all of said light is absorbed by the first EDF, whereby a quantity of ASE is emitted from the first EDF in a direction opposite to said pumping light direction;

redirecting said ASE to the second EDF for pumping the second EDF with said redirected ASE, whereby the EDFA has an improved noise figure compared to a non-ASE pumped EDF.

44. The method of claim 43 wherein redirecting said ASE to the second EDF comprises forward feeding said ASE around the first EDF into the second EDF.

* * * * *